US008543928B2

(12) United States Patent
Stovicek et al.

(10) Patent No.: US 8,543,928 B2
(45) Date of Patent: Sep. 24, 2013

(54) AUTOMATIC FRIENDS SELECTION AND ASSOCIATION BASED ON EVENTS

(75) Inventors: Thomas Jan Stovicek, Mountain View, CA (US); Erez Kikin-Gil, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 975 days.

(21) Appl. No.: 12/139,155

(22) Filed: Jun. 13, 2008

(65) Prior Publication Data
US 2009/0313555 A1 Dec. 17, 2009

(51) Int. Cl.
*G06F 3/14* (2006.01)

(52) U.S. Cl.
USPC ........... 715/753; 709/204; 709/219; 709/229; 707/3; 705/14; 379/201.12

(58) Field of Classification Search
USPC ......... 715/200–277, 700–867; 700/701–866; 709/201–229; 705/14, 50–79; 345/30–111; 379/201.12; 707/3, 200–206
See application file for complete search history.

(56) References Cited

U.S. PATENT DOCUMENTS

| 7,167,910 | B2 | 1/2007 | Farnham et al. |
| 7,370,282 | B2 | 5/2008 | Cary |
| 2005/0039142 | A1 | 2/2005 | Jalon et al. |
| 2005/0197846 | A1 | 9/2005 | Pezaris et al. |
| 2005/0210409 | A1 | 9/2005 | Jou |
| 2006/0010217 | A1 | 1/2006 | Sood |
| 2006/0031772 | A1 | 2/2006 | Valeski |
| 2006/0041460 | A1 | 2/2006 | Aaron |
| 2006/0048059 | A1 | 3/2006 | Etkin |
| 2007/0233736 | A1 | 10/2007 | Xiong et al. |
| 2007/0255807 | A1* | 11/2007 | Hayashi et al. ............... 709/219 |
| 2008/0005282 | A1 | 1/2008 | Gaedcke |
| 2008/0013705 | A1* | 1/2008 | Yoffie et al. .............. 379/201.12 |
| 2008/0033739 | A1 | 2/2008 | Zuckerberg et al. |
| 2008/0082421 | A1* | 4/2008 | Onyon et al. .................... 705/14 |
| 2008/0208812 | A1* | 8/2008 | Quoc et al. ....................... 707/3 |
| 2009/0222519 | A1* | 9/2009 | Boyd ............................ 709/204 |
| 2010/0325297 | A1* | 12/2010 | Romney et al. ............... 709/229 |

OTHER PUBLICATIONS

Unknown, "Alstrasoft E-Friends," available at http://www.alstrasoft.com/efriends.htm, printed on Feb. 28, 2008, 9 pages.
Unknown, "On Social Networking Software—Yet Again," available at http:www.minjungkim.com/2004/01/26/on-social-networking-software-yet-again/, printed on Feb. 28, 2008, 6 pages.

(Continued)

*Primary Examiner* — Ruay Ho
(74) *Attorney, Agent, or Firm* — Senniger Powers LLP

(57) ABSTRACT

A method for automatically generating a friend subset from contacts of a user based on future events is provided. Future social events data from an online social network including events to be attended by the user are received. Contacts having identity information from a contact list of the user are identified. Future social events data associated with the identified contacts, including events to be attended by the contacts, are received. Whether the identified contacts are scheduled to attend the same future social events as the user is determined. A friend subset of the determined contacts having future social events corresponding to the future social events of the user is selected and displayed on a web page. The user selects one of the contacts of the displayed friend subset, and the future social events to be attended by both the selected contact and the user is provided to the user.

15 Claims, 6 Drawing Sheets

(56) References Cited

OTHER PUBLICATIONS

Unknown,"Online Dating Innovator eTwine.com Officially Launches its Wildly Popular Social Networking and Online Dating Website with Several Thousand Members Following Completion of Beta Testing Phase. Unique Website Integrates Online Dating with Social Networ," available at http://www.download3k.com/Press-Online-Dating-Innovator-eTwine.com-Officially.html, printed on Feb. 28, 2008, 3 pages.

Unknown, "Friends and Social Timeline," available at http://www.facebook.com/help.php?p.=15, printed on Feb. 28, 2008, 5 pages.

* cited by examiner

AUTOMATIC FRIENDS SELECTION AND ASSOCIATION BASED ON EVENTS

BACKGROUND

Online social networks have become popular and useful for online users. The social networks provide various services such as blog services, photo sharing services, frequent contacts or the like. The more friends or contacts a person has, the more valuable the network can be. These lists of friends or contacts are important for the user and others in order to make new connections and see a person's social circle.

However, it is unconceivable for the network providers to list and enumerate all contacts or friends in the user's profile. One of the provided services includes a friend module or a friend list. This list displays a limited number of friends or contacts at best, hoping to show just a sample of the entire list of friends or contacts. While the user can perform sorting to organize the listing of friends in the friend module, existing providers fail to make the friend module provide more in-depth and functional purposes.

SUMMARY

Embodiments of the invention overcome the deficiencies of existing technologies by providing added functionality and advantageous to the friend module. Aspects of the invention provide the friend module showing friends or contacts that have current or future events with the user. As such, the friend module no longer displays a sample of the user's overall contacts or friends, but provide rather a rich user experience with the friends or contacts in the friend module being associated with or connected with upcoming events of the user. Alternative embodiments enable a differentiation between private or public events such that, when the friend module is made public, the private events may be kept private to persons not connected with the private events.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
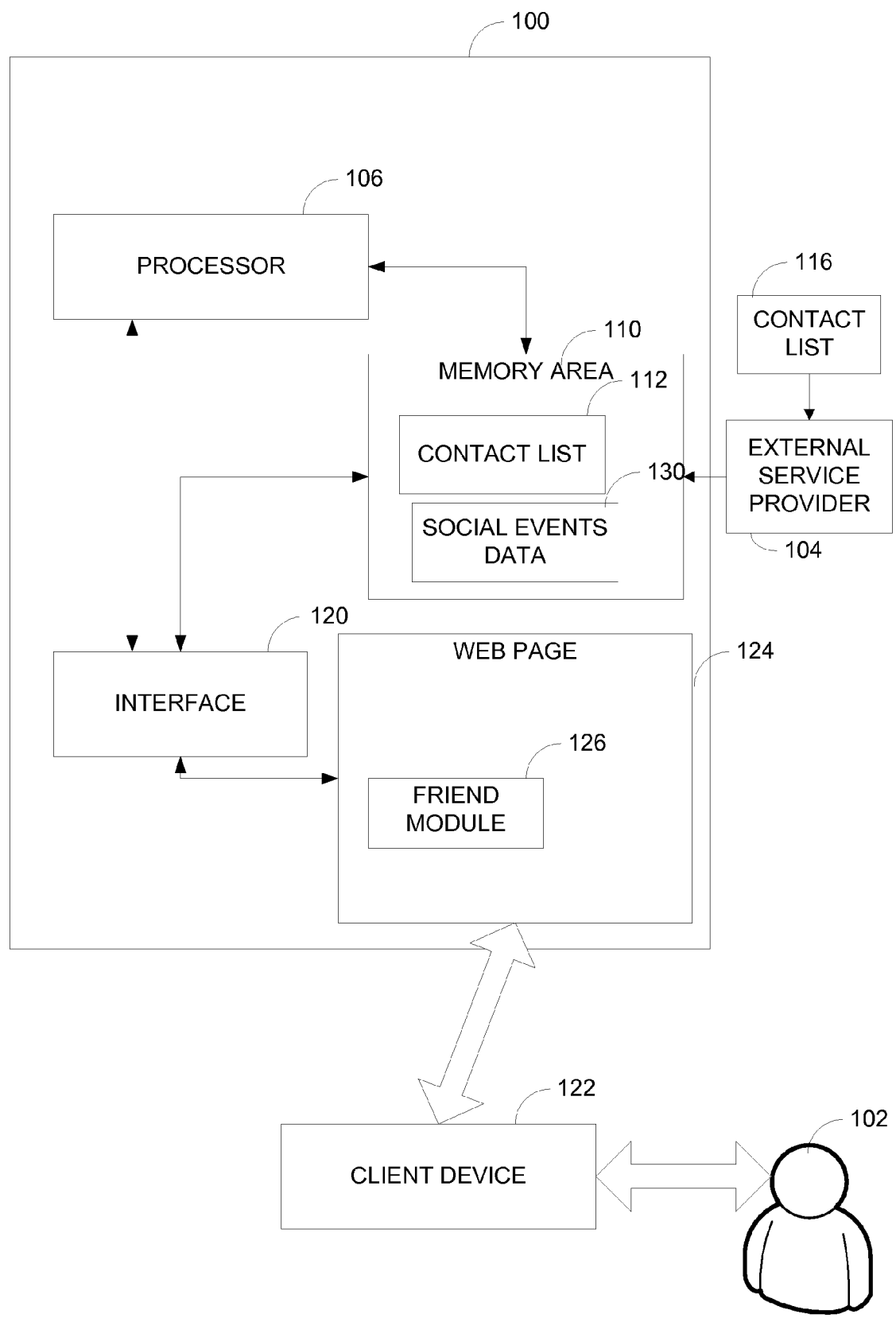
FIG. 1 is a block diagram illustrating an exemplary embodiment of a system for generating a friend subset from contacts of a user based on events according to an embodiment of the invention.

FIG. 1 is a diagram illustrating a system 100 for generating a friend subset from contacts of a user based on events according to an embodiment of the invention. For example, the system 100 may be a computer or a group/collection of computers for providing social network services. In one example, the system 100 may include one or more front-end servers, one or more back-end servers, and one or more database servers. The system 100 may also include one or more web servers, one or more authentication servers, or other specialized servers for providing social network services to a user 102. In one embodiment, the social network services including online or virtual communities of people who share interests and activities or who are interested in exploring the interests and activities of others. The online social network services include web-based ones and provide a collection of various ways for users to interact, such as chat, messaging, e-mail, video, voice chat, file sharing, blogging, discussion groups, and so on. In another embodiment, the social network services also provide online contact list or online address books for the user 102 such that the user 102 may access the online address books from any device with an active Internet connection. In another embodiment, the system 100 provides a part or all of the social network services and is coupled with other service providers, such as an external service provider 104. The external service provider 104 may provide some social network services and may independently maintain separate data storage or the like.

The system 100 also includes a processor 106. For example, the processor 106 may be a central processing unit (CPU), a microprocessor, or other processing units that are capable of execute computer-executable instructions. The system 100 also includes a memory area 110 for storing data for the system 100. The memory area 110 stores, among other things, a contact list 112 and social events data 130. In one example, the contact list 112 includes a list of contact information of an individual, such as an e-mail address, a physical address, a telephone number, an instant messaging user identification, a web link to associated services, or other contact information. In another embodiment where the user 102 and/or one of the contacts in the contact list 112 are also associated with the external service provider 104, the external service provider 104 may also include a separate contact list 116. This separate contact list 116 may include information similar to the contact list 112. In one embodiment, the external service provider 104 may communicate with the system 100 via an application programming interface (not shown). In an embodiment, the social events data 130 includes and is associated with a variety of social events relating to the user 102.

In one example, the memory area 110 includes computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the system 100.

The system 100 also includes an interface 120 for interacting with a client device 122 of the user 102. The client device 122 may be a personal computer, a personal digital assistant, a smart phone, a cellular phone, or other digital devices with displays that are capable to connect to the Internet. For example, the interface 120 may include a web page 124 having elements in the web page 124 for displaying one or more portions of the social network services to the user 102. The web page 124 may be a typical web page with text and multimedia contents, run-time executable codes/modules or widgets, or the like. In one embodiment, the web page 124 includes a friend module 126 for displaying friend contacts which is a subset of the entire contact list 112 of the user 102.

Figure 2:
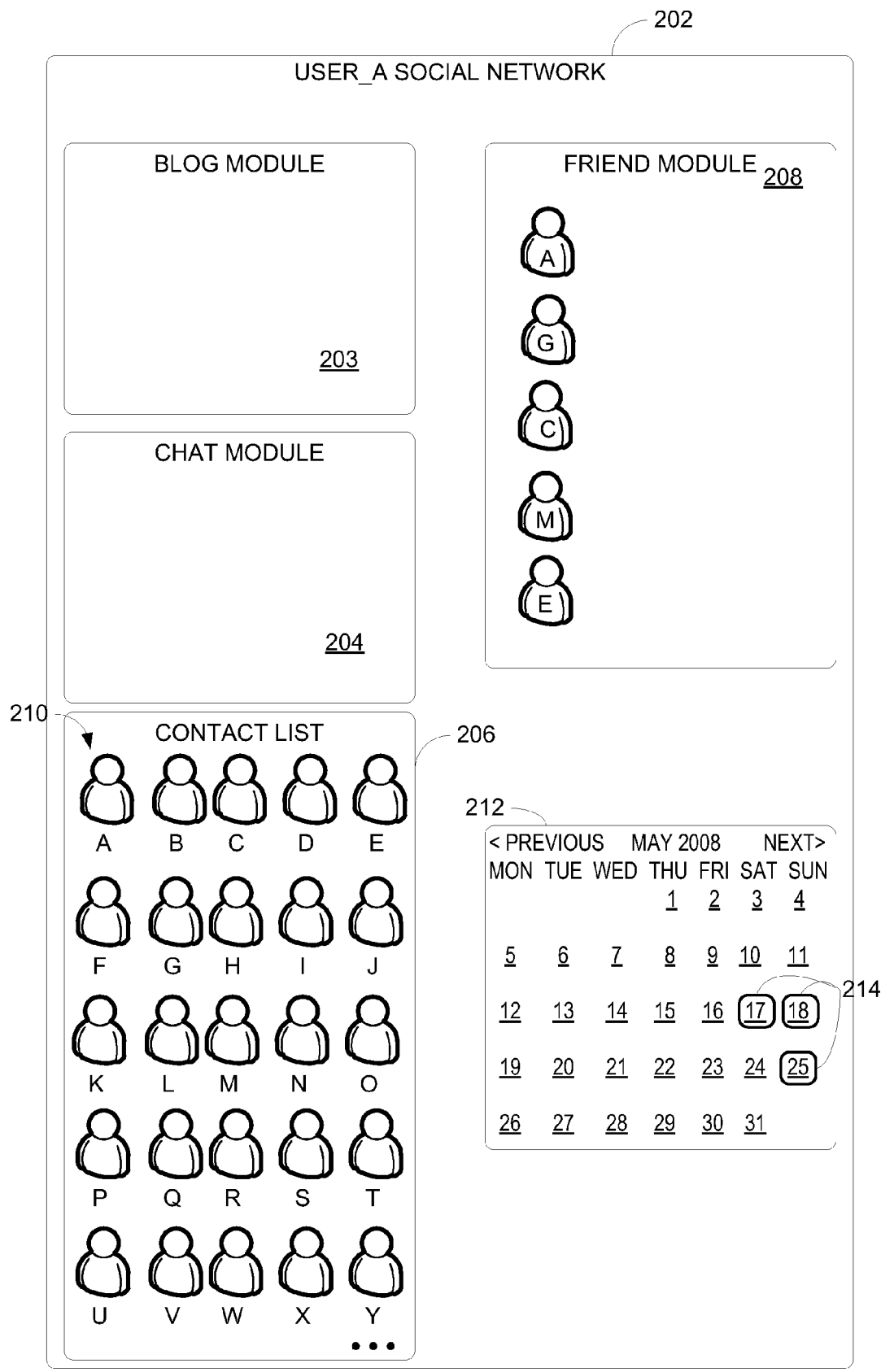
FIGS. 2 to 5 are exemplary block diagram illustrating graphical user interface (GUI) displays of a friend module on a web page according to an embodiment of the invention.

FIGS. 2 to 5 are screen displays illustrating various aspects of the invention. For example, FIG. 2 illustrates a web page 200 displaying embodiments of the invention. The web page 200 displays a blog module 203, a chat module 204, a contact list module 206, a friend module 208, and a calendar module 212. In one embodiment, the contact list module 210 may be hidden from the public view and may only be viewed to the user 102 under restricted access, such as a private and account information area of the account of the user 102.

Initially, the user 102 may have a number of contact entries in the contact list module 206. These contact entries, as shown by icons 210 A through Y, represent contact information of people associated with the user 102. Some of them have different kinds of relationships with the user 102. For example, the contact entries represented by icons 210 W through Y are family members of the user 102. Similarly, contact entries represented by icons 210 O through V may be co-workers of the user 102. Each of the contact entries may include an identity information associated the particular contact, such as name, gender, address, birthday or other information of the contact.

The web page 200 also includes the calendar module 212 which includes and is associated with a variety of social events, stored in the social events data 130 (shown in FIG. 1), relating to the user 102. These events define a social connection between a contact and the user 102 at a future occurrence or time. For example, the social events data may be a date and time of a meeting (i.e., social connection) between the user 102 and a contact on the contact list. In another embodiment, the social events data may be a direction to a park for a barbeque picnic (i.e., social connection) between the user 102 and ten contacts from the contact list. As such, the social events data includes at least a time of the social connection, a location of the social connection, and a participant of the social connection.

In another embodiment, the calendar module 212 as shown displays a monthly calendar of May 2008. The calendar module 212 also includes highlight identifiers 214 which indicate a date on the calendar module 212 that is related to one or more social events. For example, one of the highlight identifiers 214 identifies the date May 17, 2008 because it may be a date when the user 102 wishes to have a barbeque party with family members. Similarly, another highlight identifier 214 identifies the date May 18, 2008 which may indicate when the user 102 may be going to a movie with another friend or friends. Therefore, the calendar module 212 indicates or assists to indicate social events and social events data for the user 102. In another embodiment, other modules or categories of information may be provided to the user showing details of the social events data. For example, the web page 100 may display an events module listing one or more social events and the data associated each social event.

Before identifying a friend subset for the friend module 208, the processor 106 receives social events data associated with the user 102. In one embodiment, social events data 130 may be stored in the memory area 110 of the system 100. Once the social events data 130 is received, stored, or retrieved, the processor 106 identifies one or more contacts from the contact list of the user 102. As described above, each of the contacts has an identity information and the processor 106 also identifies or recognizes the identity information associated with each contact.

The processor 102 may next determine whether one of the identified contacts from the contact list is associated with the defined social connection. In one example, the processor 102 may aggregate the social events data 130 and the identified contacts information before performing the determination. When it is determined that a contact is associated with the user based on a defined social connection, the contact is included in the friend subset or the friend module 208. As shown in FIG. 2, there are five contacts that appear in the friend module 208 which indicates that these five contacts are associated with the user 102 based on a defined social connection.

Figure 3:
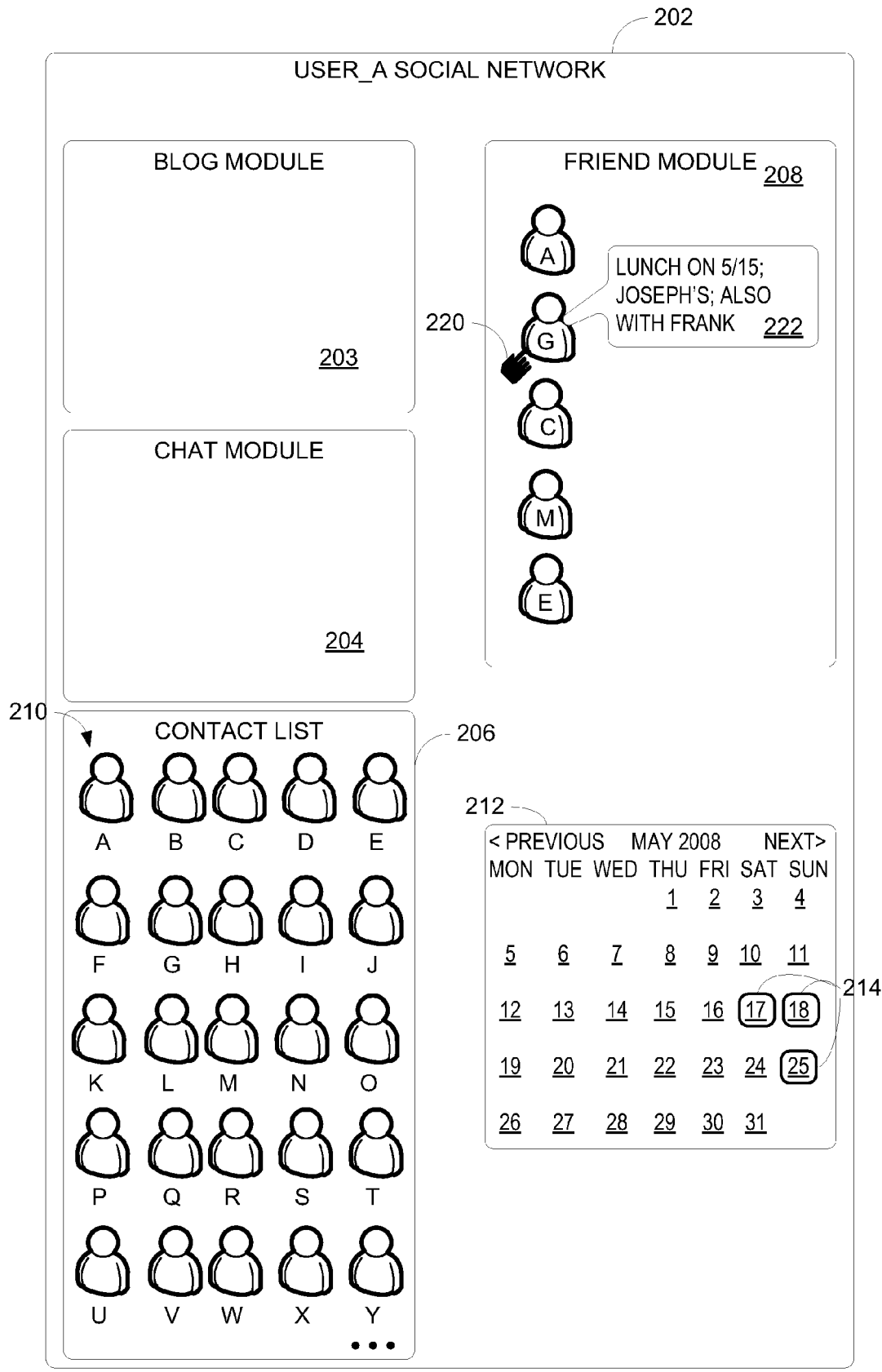

Referring now to FIG. 3, a screen display shows an interaction of the friend module 208 with the user 102 upon selecting one of the contacts in the friend module 208 according to one embodiment of the invention. The friend module 208 includes one or more friend contacts that are connected to or associated with the user 102 based on the defined social connection. In the illustrated example, the reason the contact G is in the friend module 208 is because the contact G has some sort of social connection with the user 102. When the user 102 (or other users if this portion of the web page 200 is for public viewing) selects the contact G in the friend module 208 via a cursor 220, a pop-up notification 222 appears displaying the social events data 130. In this example, the social events data 130 includes data such as "Lunch on May 15; Joseph's; also with Frank." It is to be understood that other information or data may be displayed in the pop-up notification 222 without departing from the scope of embodiments of the invention.

In another embodiment, the selection of the contacts in the friend module 208 includes an active selection of the contacts by moving a cursor of an input device (e.g., a mouse or a stylus) and depressing a mouse button or a key to trigger the display of the pop-up notification 222. In another embodiment, the selection may involve a passive selection such as by moving the cursor of the input device to a location of the contact's icon such that the cursor (e.g., cursor 220) hovers over the contact's icon to trigger or activate the display of the social events data 222.

Figure 4:
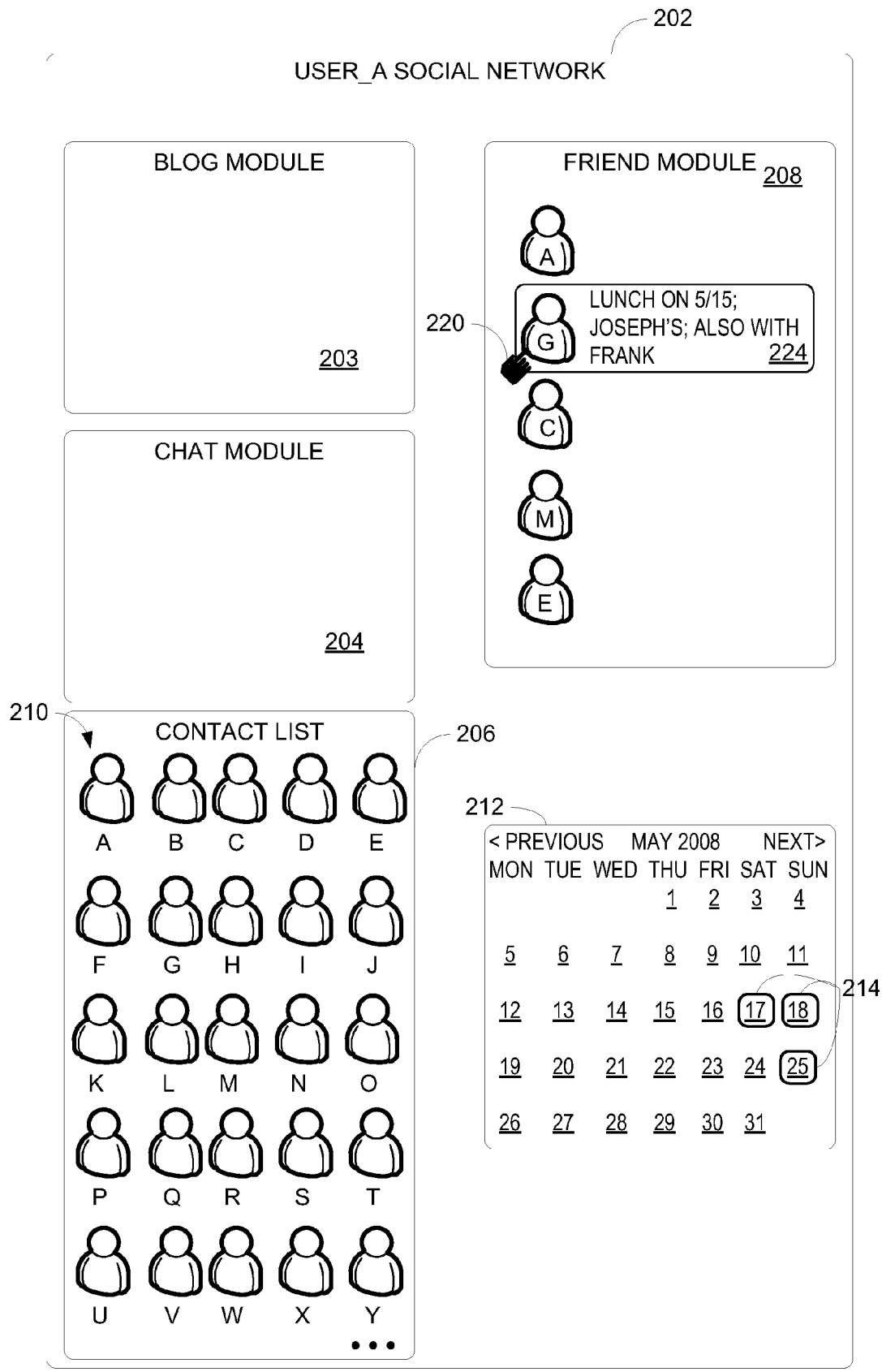
Figure 5:
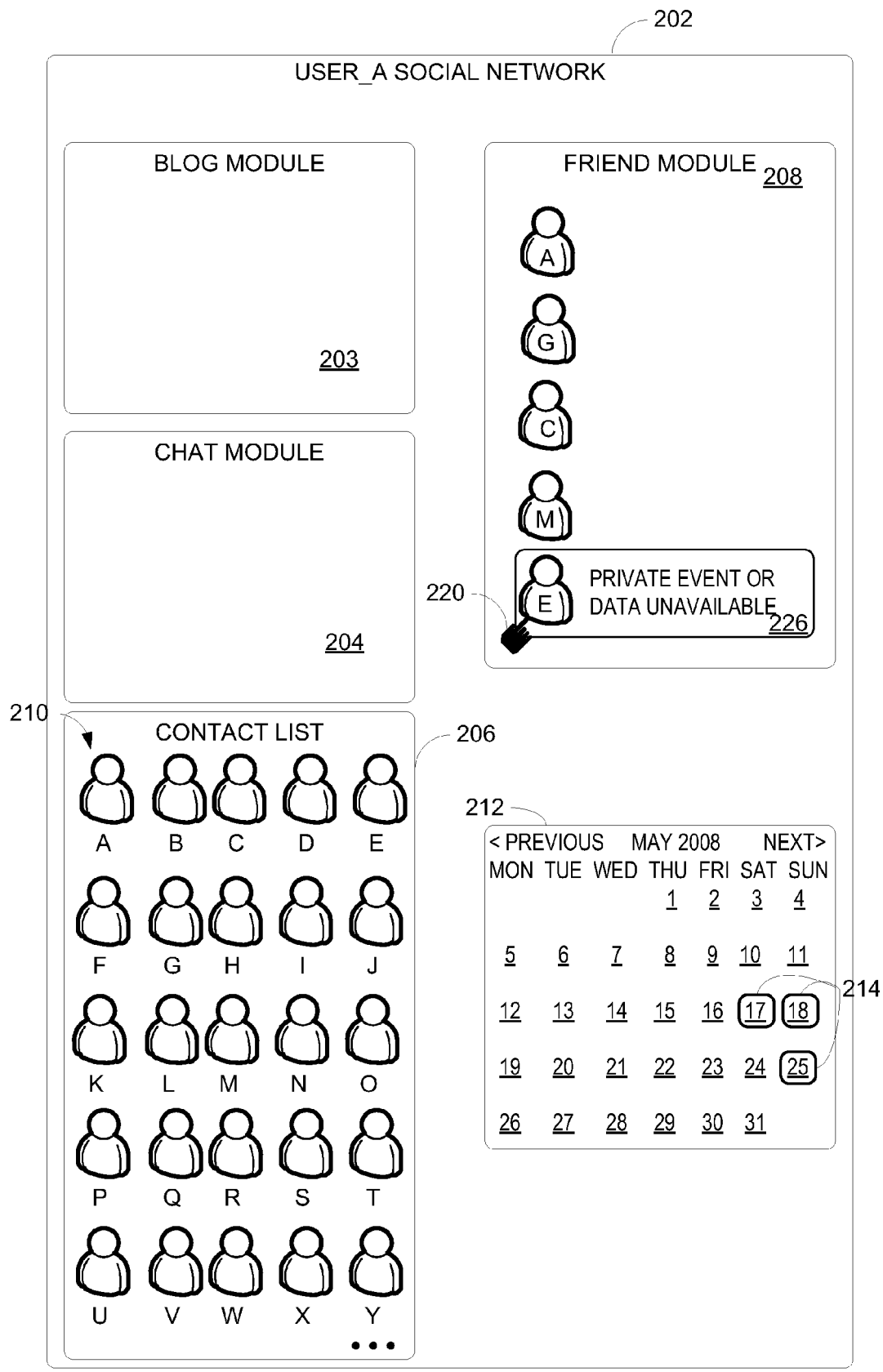

In another embodiment, instead of the pop-up notification, a display pane 224 may be used to display the social events data 130 as shown in FIG. 4.

In an alternative embodiment, before displaying the social events data 130 in response to a selection of one of the contacts in the friend module 208, the processor 106 may further evaluate or determine whether the social events data 130 is a private social connection or a public social connection. If it is determined that the social connection is a private one, a generic or canned message may be displayed, such as the message 226 "PRIVATE EVENT OR DATA UNAVAILABLE." As such, the friend module 208 is no longer a subset of a larger list of contacts; the friend module 208 provides functional and richer experience to the user 102 or others who are within the social network of the user 102.

In a further alternative embodiment, the friend module 208 also selects friends contacts in which the social events data 130 of the social connection may be stored or accessible by the external service provider 104. In other words, the processor 106 may be coupled with the external service provider 104 to retrieve or receive the social events data 130. For example, the user 102 may be a member of a number of social network service providers and each provider requires authentication (e.g., username-password pair) to access its offered services. The user 102 may provide the system 100 necessary authentication information to access information from the external service provider 104. Therefore, the friend module 208 may display friend contacts where the social events data 130 may not be initially stored in the memory area 110.

Further embodiment of the invention dynamically updates the friend module 208 as the social events data is updated. As such, the friend contacts in the friend module 208 may be updated frequently or periodically depending on and as a function of changes to the social connection between the user 102 and the friend contacts. In another alternative embodiment, the friend contacts in the friend module 208 may be sorted based on alphabetical order, grouping order (i.e., whether the user 102 groups the contacts), or the degree or frequency of the social connection. For example, the most frequently connected contacts may be selected and displayed before less frequently connected contacts. Alternatively, the friend contacts may be sorted based on the timing of the social connection. For example, suppose the friend contact A is to have a dinner with the user 102 on May 14 while the friend contact M will play tennis with the user 102 on May 18. The processor 106 may sort the friend contact A in a higher order than the friend contact M. Other sorting orders or criteria may be used without departing from the scope of embodiments of the invention.

Figure 6:
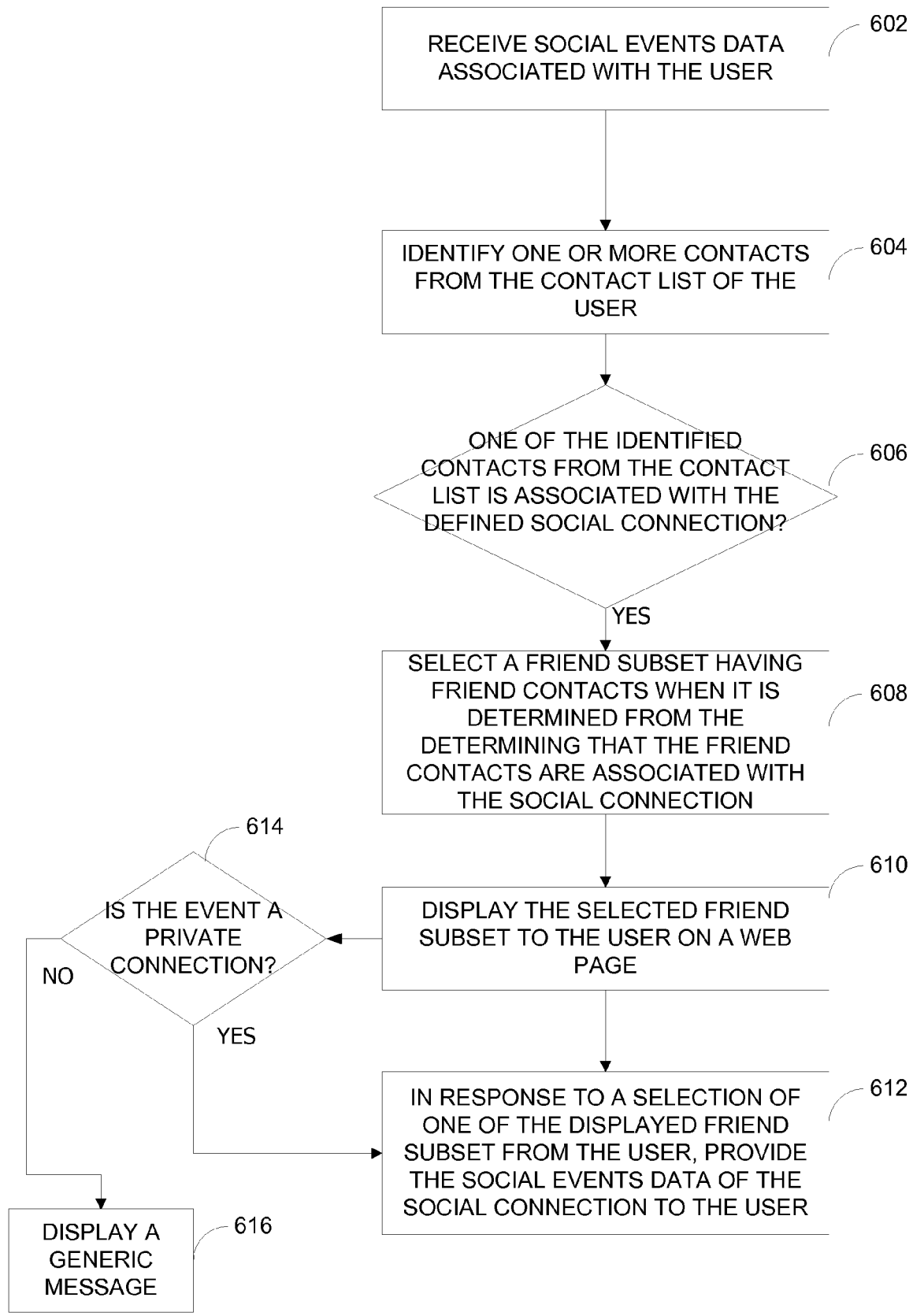
FIG. 6 is an exemplary flow chart illustrating operation of generating a friend subset from contacts of a user based on events according to an embodiment of the invention.

FIG. 6 is a flow diagram illustrating automatic generation of a friend subset from contacts of a user based on events. At 602, social events data associated with the user is received. The received events data defines a social connection between a contact in a contact list and the user at a future occurrence. At 604, one or more contacts from the contact list of the user are identified. Each of the identified contacts from the contact list includes an identity information associated each of the contacts. It is determined whether one of the identified contacts from the contact list is associated with the defined social connection at 606. If it is determined that the friend contacts are associated with the social connection, at 608, a friend subset having friend contacts is selected. At 610, the selected friend subset is displayed to the user on a web page. At 612, in response to a selection of one of the displayed friend subset from the user, the social events data of the social connection is provided to the user.

In an alternative embodiment, it is also determined whether the social connection is a private social connection at 614. If the determination is positive, a generic or canned message is displayed to the user in response to a selection of the friend contact at 616. On the other hand, if the determination is negative, the received social events data is provided to the user in response to a selection of the friend contact in the friend subset.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including system 100 and/or client device 114, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, system 100 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer implemented method executable by a processor, said method for a user of an online social network for automatically generating a friend subset from contacts of a user stored in a memory, the friend subset based on future events, said method comprising computer executable instructions for:

accessing the online social network via the internet;

receiving future social events data from the online social network associated with the user, said received future social events data associated with the user including one or more future social events to be attended by the user wherein the future social events are events scheduled for the user in the user's calendar after a time of said accessing;

identifying one or more contacts who are members of the online social network from at least one of an online address book of the user and an on-line calendar of the user, the identified contacts associated with the one or more future social events of the user, wherein the address book of the user and the calendar of the user each store electronic data in a memory that is accessible via the processor, and each of the said identified contacts from the address book of the user and the calendar of the user include identifying information about the contact;

receiving the future social events data, in an electronic form, from at least one of the address book of the identified contacts and the calendar of the identified contacts, wherein the received social events data associated with one or more of the identified contacts includes events to be attended by the one or more identified contacts;

correlating the received future social events of the identified contacts with the received future social events data associated with the user to determine common future social events to be attended by both the user and the one or more identified contacts;

based on the determined common future social events to be attended by both the user and the one or more identified contacts, determining a friend subset, the friend subset identifying the one or more contacts having future social events in common with the user;

displaying the selected friend subset to the user on a web page; and selecting at least one friend in the friend subset by using a cursor to hover over the selected friend's name, and providing to the user the future social events of the selected friend.

2. The method of claim 1, wherein said providing the future social events of the selected contacts in the friend subset comprises providing to the user at least one of the following: a time of the future social event, a date of the future social event, a location of the future social event, directions to the location of the future social event, and an identity of a participant of the future social event.

3. The method of claim 1, wherein said providing the future social events of the selected contacts comprises providing to the user at least one of the following: identifying an appointment, identifying a meeting place, identifying the future social event as an inaccessible private social event, identifying the future social event as an accessible public social event, or a label indicating a type of social gathering.

4. The method of claim 1, further comprising additionally determining whether each corresponding future social event is identified as a private social event in response to the selection from the user of one of the contacts of the displayed friend subset, wherein the processor executes a computer-executable instruction that results in a message being displayed that the future social event of the selected contact is a private social event, wherein the private social event details are inaccessible.

5. The method of claim 1, further comprising retrieving the identity information associated with each of the one or more contacts from an external service provider providing the online social network, said retrieving comprising providing a proper authentication of the user to the external service provider and retrieving the identity information of one or more contacts from the contact list from the external service provider to the user.

6. A computer-based method executable by a processor for providing a graphical user interface (GUI) to a user of an online social network for automatically generating a friend subset based on future social events of a user, said GUI being included in a web page, said method comprising computer executable instructions for:

receiving future social events data, in an electronic form, from an online social network associated with the user, wherein the future social events data includes one or more future social events that the user plans on attending;

providing a first display area for displaying a user profile, wherein the user profile includes a contact list including one or more contacts of the user;

receiving the one or more future social events data, in an electronic form, associated with one or more of the contacts of the user from at least one of an address book and a calendar associated with one or more of the contacts from the contact list, wherein the one or more future social events data includes one or more future social events to be attended by one or more of the contacts;

correlating the received one or more future social events data associated with the contacts of the user with the received one or more future social events data associated with the user to determine common future social events to be attended by both the user and the one or more contacts in the contact list, said each identified contact including a graphical icon and associated identity information;

based on the common future social events to be attended by both the user and the one or more contacts, providing a second display area for displaying on the web page a friend subset to the user of the one or more contacts having future social events corresponding to the future social events of the user, the friend subset having a graphical icon displayed on the GUI representing each determined contact having a common future social event with the user; and in response to the user selecting at least one contact by hovering over the graphical icon of the contact listed in the friend subset, providing to the user a graphical display of all the future social events of the selected contact.

7. The method of claim 6, wherein said receiving future social events data of one or more contacts comprises receiving at least one of the following: a time of the future social event, a date of the future social event, a location of the future social event, and an identity of a participant of the future social event.

8. The method of claim 6, wherein said receiving future social events data associated with the user comprises receiving at least one of the following: identifying an appointment time of the future social event, identifying a meeting place of the future social event, identifying the future social event as an inaccessible private social event, an accessible public social event, or a label indicating a type of social gathering.

9. The method of claim 6, wherein, in response to the user selecting at least one contact, via hovering over the graphical icon of the contact, from the friend subset and determining the future social event is a private social event, the processor executes a computer-executable instruction that results in a message being displayed on the web page that the future social event of the selected contact from the friend subset is an inaccessible private social event.

10. The method of claim 6, further providing a display window for retrieving the identity information associated with each of the one or more contacts selected by the user from the friend subset from an external service provider, said retrieving comprising receiving authentication input from the user, providing the received authentication input to the external service provider, and retrieving the identity information associated with the one or more contacts selected by the user from the external service provider to be displayed to the user.

11. A system for automatically generating a friend subset for a user of an online social network from a contact list generated from an on-line address book of the user storing electronic data relating to one or more contacts of the user and from an on-line calendar of the user storing-electronic data relating to future social events of the user, said system comprising:

a memory area for storing future social events data associated with the user received from an online social network, said received future social events data defining one or more future social events between a contact in the contact list and the user;

a processor configured to execute computer-executable instructions, wherein the instructions, when executed, direct the processor to perform the steps for:

retrieving, for each of the identified contacts in the contact list, one or more future social events from the on-line address book storing electronic data and one or more future social events from the on-line calendar, and retrieving associated identity information about the contact from a service provider external to the system, and storing the retrieved future social events of the identified contacts and the identity information of the contacts in said memory area;

correlating the received future social events of the identified contacts with the received future social events data associated with the user to determine common future social events to be attended by both the user and the one or more identified contacts;

based on the determined common future social events to be attended by both the user and the one or more identified contacts, determining a friend subset, the friend subset identifying one or more contacts having future social events in common with the user and each contact having an associated graphical icon;

an interface for providing the selected friend subset to the user on a web page;

in response to a selection from the user, via hovering over the graphical icon of one of the identified contacts of the displayed friend subset, said interface for providing the social events data of the associated future social events of the selected contact to the user; and wherein the processor dynamically updates the friends subset in response to an update of the future social events between the user and one of the contacts in the contact list.

12. The system of claim 11, wherein the interface provides at least one of the following social events data of the future social events of the user including a time of the future social event, a date of the future social event, a location of the future social event, and a participant of the future social event.

13. The system of claim 11, wherein the future social event of the user comprises at least one of the following: identifying an appointment, identifying a meeting, a label indicating a private social event, a label indicating a public social event, or a label indicating a type of social gathering.

14. The system of claim 11, wherein the processor is further configured to determine whether the future social event is labeled as a private social event, wherein in response to the user selecting one of the contacts of the displayed friend subsets, the interface provides a message that the future social event is a private social event and no additional information about the future social event will be provided.

15. The system of claim 11, wherein the memory area is coupled to the service provider external to the system for retrieving the identity information of one or more contacts from the contact list of the user, said retrieving comprising providing a proper authentication of the user to the service provider, and retrieving the identity information of at least one or more contacts from the displayed friend subset selected by the user from the service provider for the user.

* * * * *